(12) United States Patent  (10) Patent No.: US 8,781,678 B2
Hansen et al.  (45) Date of Patent: Jul. 15, 2014

(54) METHOD FOR ADJUSTING TIRE PRESSURE

(71) Applicant: Claas Selbstfahrende Erntemaschinen GmbH, Harsewinkel (DE)

(72) Inventors: Thomas Hansen, Bueren (DE); Andreas Krauss, Schwalmstadt (DE); Sebastian Wagemann, Oelde (DE); Carsten Fuhrmann, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/908,065

(22) Filed: Jun. 3, 2013

(65) Prior Publication Data
US 2013/0325261 A1 Dec. 5, 2013

(30) Foreign Application Priority Data

Jun. 4, 2012 (DE) .......................... 10 2012 010 942

(51) Int. Cl.
*B60C 23/00* (2006.01)
(52) U.S. Cl.
CPC .............. *B60C 23/00* (2013.01); *B60C 23/001* (2013.01)
USPC ........................................................ 701/36
(58) Field of Classification Search
CPC ............................... B60C 23/00; B60C 23/001
USPC .......................................................... 701/36
See application file for complete search history.

(56) References Cited

U.S. PATENT DOCUMENTS

| | | | | |
|---|---|---|---|---|
| 5,465,772 A | * | 11/1995 | Sartor | 152/416 |
| 5,618,361 A | * | 4/1997 | Colussi et al. | 152/416 |
| 5,629,874 A | * | 5/1997 | Mittal | 702/140 |
| 6,036,449 A | * | 3/2000 | Nishar et al. | 417/292 |
| 6,218,935 B1 | * | 4/2001 | Corcoran et al. | 340/444 |
| 6,561,017 B1 | * | 5/2003 | Claussen et al. | 73/146 |
| 6,666,078 B1 | * | 12/2003 | Claussen et al. | 73/146 |
| 6,856,245 B2 | * | 2/2005 | Smith et al. | 340/442 |
| 6,865,930 B1 | * | 3/2005 | Claussen et al. | 73/146 |
| 7,530,379 B1 | * | 5/2009 | Becker et al. | 152/415 |
| 8,021,122 B2 | * | 9/2011 | Clayton et al. | 417/2 |
| 8,078,377 B2 | * | 12/2011 | Diekmeyer et al. | 701/70 |
| 2011/0297246 A1 | * | 12/2011 | Radosevic | 137/224 |
| 2012/0048965 A1 | * | 3/2012 | Malsam | 239/71 |
| 2013/0054091 A1 | * | 2/2013 | Leclerc et al. | 701/37 |

FOREIGN PATENT DOCUMENTS

DE      10 2009 051 403       5/2011

* cited by examiner

*Primary Examiner* — Thomas Tarcza
*Assistant Examiner* — Alex C Dunn
(74) *Attorney, Agent, or Firm* — Michael J. Striker

(57) ABSTRACT

A method for adjusting the pressure in at least one first and one second tire of a vehicle from a starting value to a target value, includes that the target value is located between the starting value and a pressure of a pressure reservoir. The method includes allowing air to flow through a first line between the first tire and the reservoir and through a second line between the second tire and the reservoir, determining which tire is likely to reach the target value sooner and throttling the air flow through the line of the tire identified in the determining increasing the air flow through the line of the tire that was not identified in the step of determining.

15 Claims, 3 Drawing Sheets

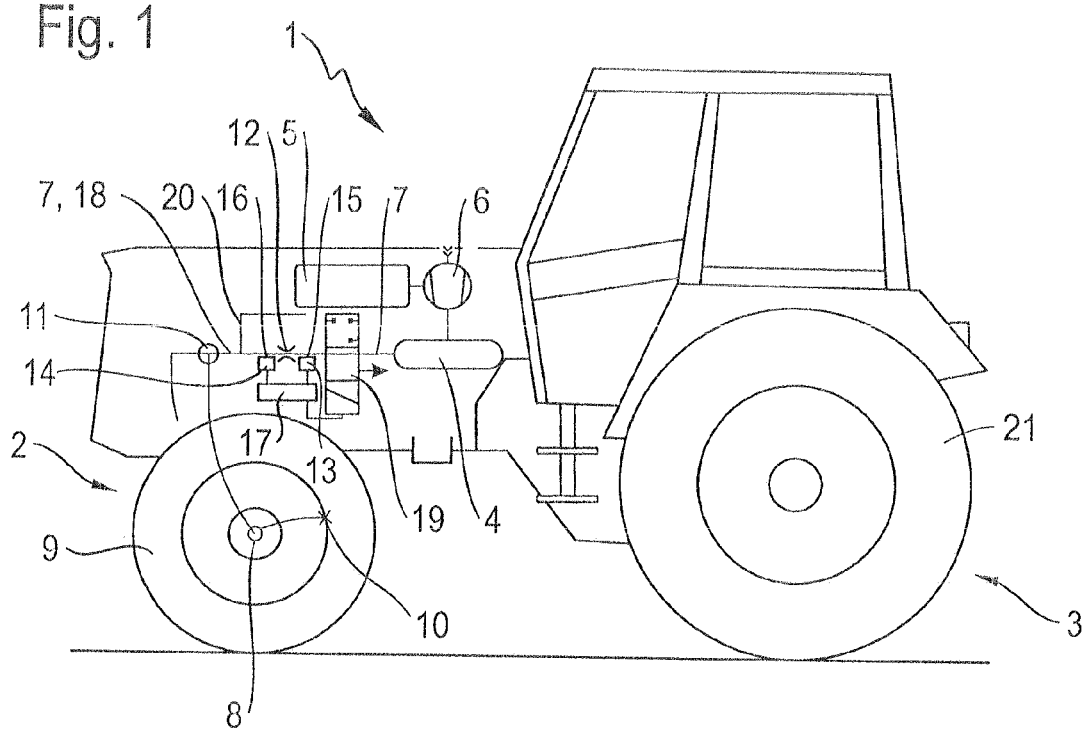
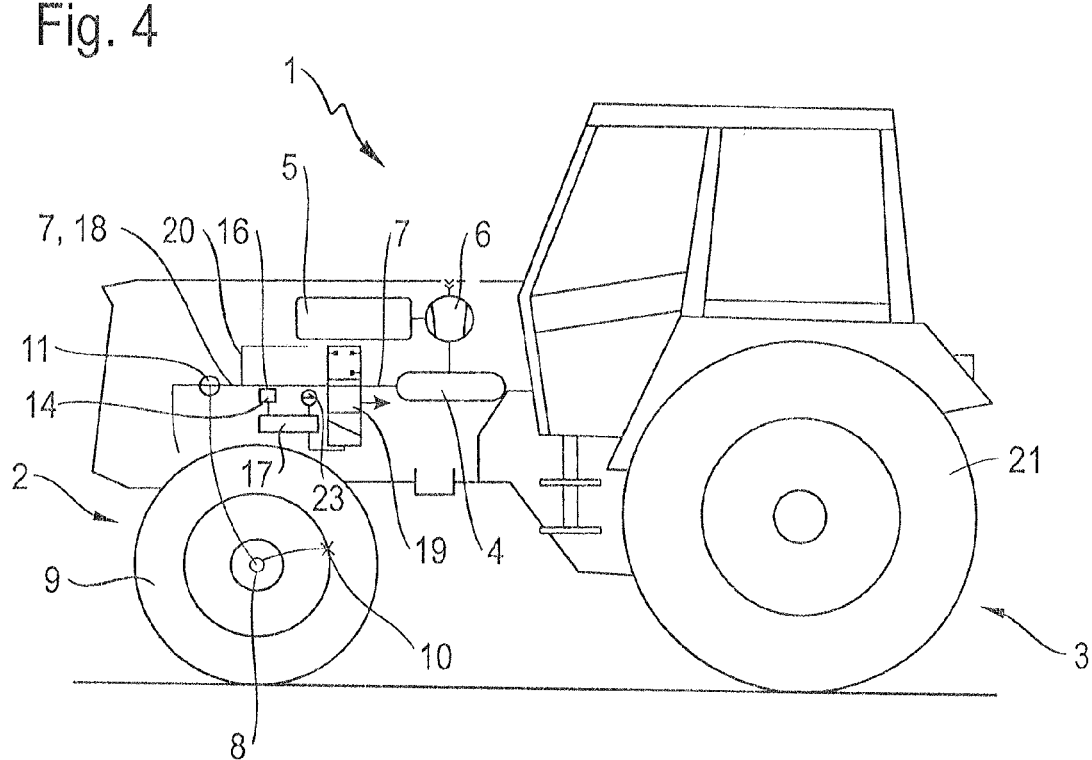

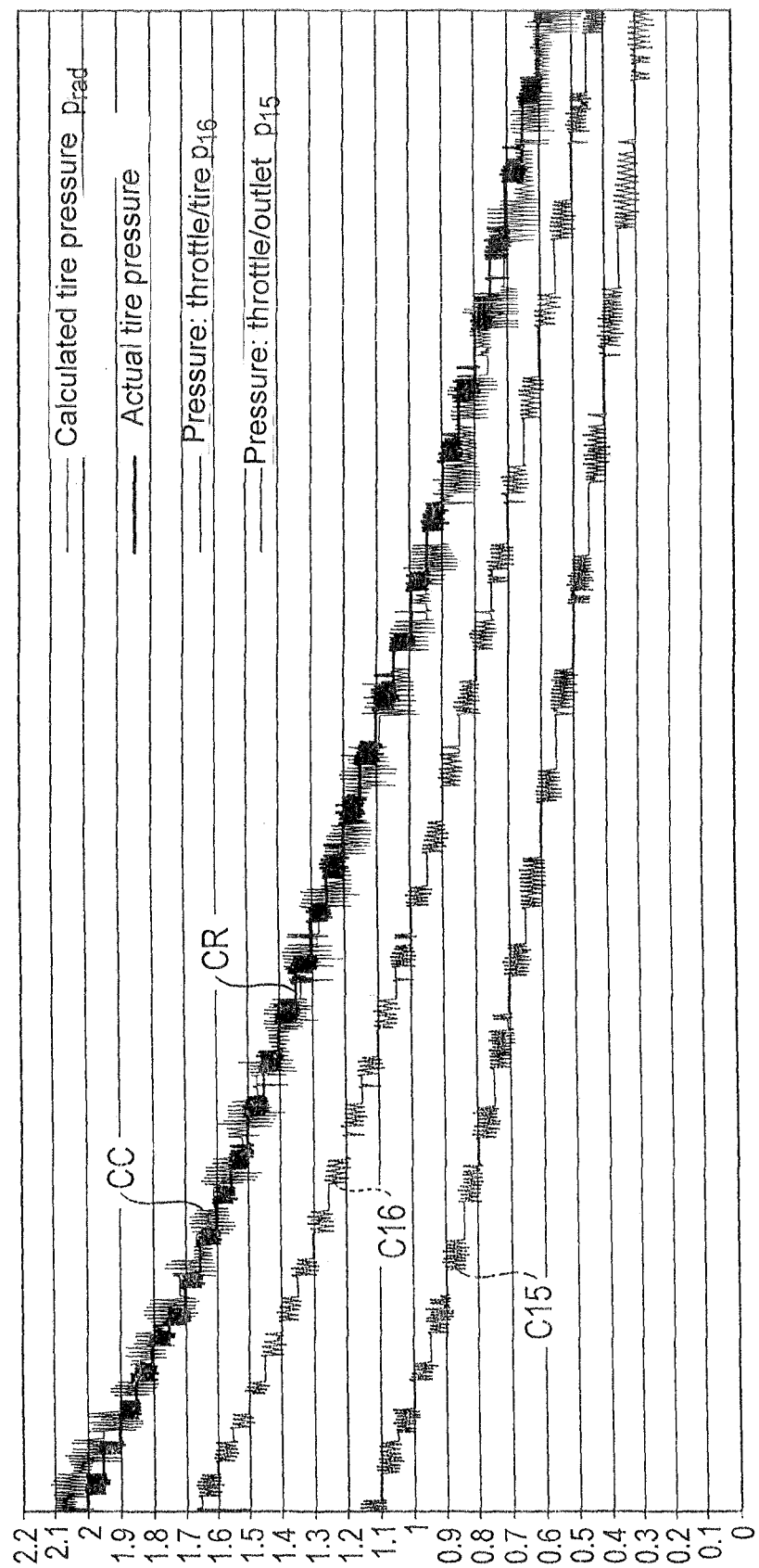

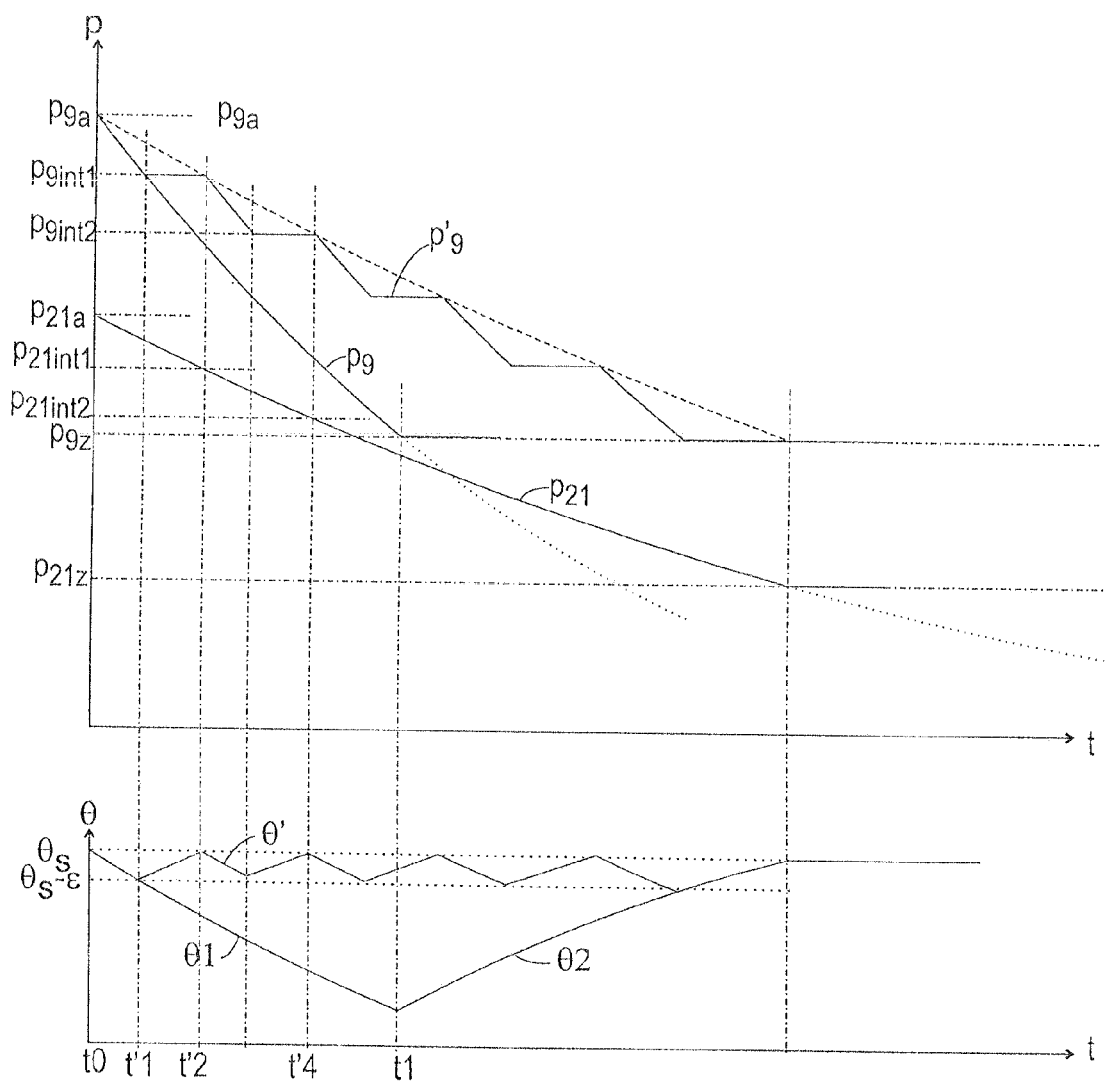

METHOD FOR ADJUSTING TIRE PRESSURE

CROSS-REFERENCE TO A RELATED APPLICATION

The invention described and claimed hereinbelow is also described in German Patent Application DE 10 2012 010942.3, filed on Jun. 4, 2012. This German Patent Application, subject matter of which is incorporated herein by reference, provides the basis for a claim of priority of invention under 35 U.S.C. 119(a)-(d).

BACKGROUND OF THE INVENTION

The invention relates to a method for adjusting the pressure in pneumatic tires, in particular in pneumatic tires of an agricultural vehicle.

The ideal tire pressure varies greatly in agricultural vehicles, depending on operating conditions. In the case of road travel, high tire pressures ensure that the rolling friction and flexing work carried out at the tires is minimal. This results in forward motion that is energy-efficient and gentle on material. A much lower tire pressure is desirable for field work, however, in order to distribute the weight of the vehicle across a large ground contact area and thereby minimize soil compression and, to allow the tire profile to adapt to the ground and thereby permit efficient transfer of the drive force. It is therefore desirable per se to adjust the tire pressure whenever switching between road travel and field work. If the vehicle driver must spend too much work time adjusting the tire pressure, however, it can be assumed that such adjustment at said switching will not be carried out, or rarely carried out.

Patent document DE 10 2009 051 403 A1 makes known a tire pressure monitoring system for a vehicle, in which all the vehicle tires are connected to a common distribution line. The distribution line is connected to a pressure accumulator via a control valve and a throttle. The direction of an air flow through the throttle can be detected with the aid of pressure sensors disposed on either side of the throttle. When the air flow comes to a halt, the pressure in the tires has reached the same level as that of the pressure accumulator, the tire valves and the control valve can be closed and the tires can be disconnected from the distribution line. Since the pressure differential between the tires and the pressure accumulator diminishes continuously over time as tire pressure is adapted using this conventional system, the air flow also slows down and the time required for pressure to equalize is long.

Additionally, agricultural vehicles such as combine harvesters or tractors in particular often comprise tires of different sizes at the rear and front axles, wherein the tires are operated using different pressures. In order to adjust the pressure thereof, the pressure accumulator must be set to two different pressures, one after the other, which greatly extends the duration of the pressure-adaptation procedure.

A further known problem is that the vehicle tilts when the pressure is adjusted at the front and rear axles of the vehicle one after the other. If the vehicle is a tractor having a soil management tool, such as a plow, a cultivator or the like mounted thereon, the tilting motion results in a change in the depth to which the working tool extends into the soil. If the tractor moves during this time, then the soil management carried out during the pressure adjustment will be faulty due to the fluctuation in the engagement depth. Therefore, the vehicle must be at a standstill when the pressure adjustment is carried out and the driver must spend working time therefor.

SUMMARY OF THE INVENTION

The present invention overcomes the shortcomings of known arts, such as those mentioned above.

The invention provides a method for adjusting tire pressure on a vehicle that requires very little time to carry out.

In an embodiment, the method includes adjusting the pressure in at least one first and one second tire of a vehicle from a starting value to a target value, which is located between the starting value and the pressure of a pressure reservoir. The method includes a) allowing air to flow through a first lines between the first tire and the reservoir and through a second line between the second tire and the reservoir;

b) determining which tire is likely to reach the target value thereof sooner;

c) throttling the air flow through the line of the tire identified in b) or increasing the air flow through the line of the tire that was not identified in b).

Of the two alternatives in step c), the first one is preferred since it is easier, in step a), to allow the air to flow through both lines at a maximum flow rate that can be achieved (e.g. a flow rate that occurs when the valve of the line is completely open), wherein a further increase cannot be carried out in step c).

Preferably, monitoring the pressure in the tires is used as the basis for determining which of the tires is likely to reach the target value thereof sooner.

Also, the tilt angle of the vehicle, which changes during the pressure adjustment, also is monitored with the aid of a tilt angle sensor. Such monitoring supports deciding which tire is likely to reach the target value thereof sooner. In general, this will be the tire having the axle height that changes most rapidly during step a).

Since air is allowed to flow through both lines simultaneously, the total time required to adjust the pressure is greatly reduced. Since the air flow is throttled in the tire that is likely to reach the target value thereof sooner, the total time required to adjust the pressure is not extended. Instead, the amount of time actually required to reach the target value can be made substantially consistent in both tires.

Tilting motions of the vehicle caused by pressures at different axles adapted at different rates are minimized. Fluctuations in the soil engagement depth of a soil management tool carried by the vehicle also are minimized, ensuring that soil management can continue faultlessly even while the pressure is adjusted. However, if the pressure is adjusted while the vehicle is traveling, the vehicle driver loses practically no time due to the pressure adjustment.

The inventive method is particularly simple to implement when the throttling in step c) involves temporarily blocking the line to the tire identified in step b). This makes it possible to use simple and low-cost stepped valves to control the air flow through the lines.

Preferably, at least one intermediate value of the pressure is determined on the basis of the starting values and target values for the first and the second tires. Such a determination serves various purposes. For example, if pressure monitoring is used in step b), as the basis for determining which tire is likely to reach the target value thereof sooner, then the tire that reaches the intermediate value thereof first can be identified.

Advantageously, the line to this tire remains blocked until the other tire also has reached the intermediate value thereof. The greater the number of intermediate values determined to be suitable, the more the tilting motions of the vehicle caused by changing tire pressures can be minimized.

Preferably, the intermediate values are determined in such a way that, when the intermediate values are set in both tires, the vehicle assumes the same tilt angle that exists when the target values have been set.

If, as mentioned above, a tilt angle sensor is available for monitoring the tilt angle of the vehicle, then, in step c), the line to the tire identified in step b) can be blocked until the tilt angle has reached a target value.

Advantageously, this target value corresponds to the tilt angle that results after the target value is set in the first and second tires. It is thereby possible to minimize deviations of the actual tilt angle from the target value.

If the method is carried out so often that pressure losses occurring in the tires between two pressure adjustments can be disregarded, then it can be assumed that the tilt angle of the vehicle at the beginning of the pressure adjustment is the same as at the end thereof, and that the tilt angle changes only within very narrow limits during the pressure adjustment. Hence, the inventive method also be carried out on a traveling vehicle that carries a soil management tool without the soil engagement depth of the tool changing to a decisive extent during the procedure.

In order to minimize the amount of time required for the procedure, it is desirable to be able to estimate the pressure in one of the tires without having to first interrupt the air flow in the line between the tire and the pressure reservoir. Such an estimate can be based on a pressure drop measured at the line.

Preferably, a throttle point at which the pressure drop is measured is provided at the line. This advantageously utilizing a sum of a pressure measured at the line and a correction term that depends on the pressure drop as the pressure in the tire.

Good agreement between the estimated and actual reference pressures is achieved when the pressure drop used in the correction term has an exponent that differs from 1.

Experiments have shown that the value of the exponent that yields the optimal agreement between the estimated and actual tire pressures varies depending on the geometry of the line and, possibly, the throttle point formed therein. It is advantageous, therefore, to empirically determine the exponent for each line geometry. In most cases, optimal agreement was found when the exponent had a value less than 0.9 and greater than 0.5. Exponents greater than 1.1 also can occur, however.

BRIEF DESCRIPTION OF THE DRAWINGS

Further features and advantages of the invention will become apparent from the description of embodiments that follows, with reference to the attached figures, wherein:

FIG. 1 presents a schematic depiction of an agricultural vehicle designed to implement one embodiment of the invention;

FIG. 2 depicts development of the true tire pressure, the air pressures at two measurement points of a line extending between tires and a pressure reservoir and a tire pressure estimated on the basis of these measured pressures while air flows out of a tire of the vehicle according to FIG. 1;

FIG. 3 depicts shows development of the pressure in the front and rear tires of the vehicle according to FIG. 1 as a function of time when the method according to the invention is carried out; and FIG. 4 presents a schematic depiction of an agricultural vehicle according to an embodiment of the invention.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIG. 1 depicts example of an agricultural vehicle in which the method according to the invention is used. That is, tractor 1 is depicted in which the front wheels 2 are much smaller than the rear wheels 3 and, therefore, often require a higher tire pressure than the latter. For that matter, the inventive method could be implemented in a combine harvester in which the size and pressure ratios of front and rear wheels are generally opposite.

A high-pressure reservoir 4 is located on-board the tractor 1 and, is connected to a compressor 6. The compressor is driven by a diesel engine 5 of the tractor 1 in order to restore the high-pressure reservoir 4 to a specified nominal pressure after every outflow of compressed air. Compressed-air lines 7, 20 extend from the reservoir 4 to air chambers of a left and a right front-wheel tire 9 and to air chambers of a left and a right rear-wheel tire 21. The lines 7, 20 have similar designs, and so FIG. 1 shows only a detailed view of the line 7 and the components distributed thereon.

At one point 11, the compressed-air line 7 forks into two branches leading to the right and to the left front wheels 2, respectively. Each branch extends via a rotary joint 8 to a poppet valve 10 at an air chamber of the left and the right front-wheel tire 9. The point 11 can be in the form of a simple T-piece, via which the air chambers of the front-wheel tires 9 communicate when the poppet valves 10 are open. In that case, the front-wheel tires 9 can only be adjusted simultaneously and to the same tire pressure. The point 11 can also be in the form of a directional control valve that connects the reservoir 4 either to the right or the left front-wheel tire 9 or to both tires 9 simultaneously. Since a single front-wheel tire also can be connected to the reservoir 4, different pressures can be set in the two front-wheel tires 9. This is significant mainly when one of the two cannot hold pressure due to a defect.

The poppet valve 10 is normally closed. An electric control signal or an overpressure present at the line 7 is used to switch this poppet valve to an open position. In the latter case, it is sufficient to apply compressed air from the high-pressure reservoir 4 to the line 7 in order to establish a connection between the front-wheel tires 9 and the high-pressure reservoir 4, via which air flows into the front-wheel tires 9.

The compressed-air line 7 comprises a throttle point 12 at which the air flow from the reservoir 4 to the tires 9 induces a pressure drop. In order to detect this pressure drop, two pressure sensors 13, 14 are connected at a measurement point 15 on the reservoir side and at a measurement point 16 on the tire side, respectively, on either side of the throttle point 12. An electronic control unit 17 connected to the sensors 13, 14 is designed to computationally determine the difference between the pressures $p_{15}$, $p_{16}$ at the measurement points 15, 16. Preferably, however, one of the two sensors (e.g., sensor 13 on the reservoir side) is a differential sensor connected to both measurement points 15, 16. Such arrangement enables the control unit 17 to receive a signal directly from this sensor that is representative of the pressure differential between the measurement points 15, 16.

Provided the poppet valves 10 are closed and air does not flow in the line 7, the pressure differential is zero and the pressure $p_{15}=p_{16}$ is independent of the pressure in the tires 9.

If the poppet valves 10 are open and the pressure in the tires 9 differs from that of the high-pressure reservoir 4, however, air flows into the line 7 and the pressure differential $p_{15}$-$p_{16}$ differs from zero. The true pressure in the front-wheel tires 9 differs from the pressure $p_{16}$ at the tire-side measurement point 16 since a section 18 of the line 7 extending between the measurement point 16 and the tires 9 also has significant flow resistance. The rotary joints 8 and the poppet valves 10 of the tires 9, among other things, contribute to the flow resistance. Surprisingly, it is found that this pressure drop is generally not exactly proportional to the pressure drop $p_{15}$-$p_{16}$ at the throttle point 12, but rather that the true pressure in the tires 9 is approximated with high accuracy as a function of the pressures $p_{15}$, $p_{16}$ by means of the expression:

$$p_{rad}=p_{16}-y(p_{15}-p_{16})^z, \qquad (1)$$

wherein z is empirically determined for a given geometry of the line 7 and the components disposed thereon, such as 11, 8, 10, etc., and deviate significantly from 1. The factor y is a quantity that is empirically determined for a given line geometry in a specific case, although guide values cannot be provided for the numerical value thereof since the guide values depend on the unit of measure used for the pressures, among other things.

The exponent z, which differs from 1, may be due to a different turbulence behavior at the throttle point 12 and the section 18 of the line 7 extending between the measurement point 16 and the tire 9. The onset of turbulence results in a greater pressure drop and, if the tendency for turbulence to form at the throttle point 12 is greater than at the line section 18 located between this throttle point and the tire 9, then, as the pressure differential at the line 7 increases, the pressure differential at the throttle point 12 increases more rapidly than at the section 18. In response, z assumes a value less than 1.

However, if the throttle point 12 is wide and the tendency thereof to form turbulence is low, then the pressure drop at the section 18 can increase more rapidly than at the throttle point 12, thereby resulting in an exponent z>1. In order to accurately calculate the tire pressure, it is advantageous for the pressure differential $p_{16}$-$p_{15}$ to be great enough to be measured with a low percentage error, wherein, however, the contribution made by the correction term $y(p_{15}$-$p_{16})^z$ is less than the pressure differential $p_{15}$-$p_{16}$. Since this requires a greater pressure drop at the throttle point 12 than at the line section 18, the throttle point 12 must be narrow and the tendency thereof to form turbulence must be correspondingly high. The result is that the tire pressure can be calculated more accurately given a geometry of the line 7 that results in an exponent z<1 than is the case with an exponent z>1.

It should be clear that by reference to the pressure measurements at the measurement points 15, 16, the control unit 17 calculates an instantaneous pressure $p_{rad}$ in the tire 9 at any time while air flows through the line 7 using formula (1) or a look-up table derived therefrom, and then utilizes the knowledge of this pressure to close the poppet valves 10 at the instant at which $p_{rad}$ reaches a target value.

Alternatively, the line 7 also can be held open initially until the pressure in the tire 9 has adapted to the pressure in the reservoir 4. Next, by switching a directional control valve 19 disposed at the compressed-air line 7 between the reservoir 4 and the measurement point 15, the reservoir-side measurement point 15 is disconnected from the high-pressure reservoir 4 and is connected to the surroundings 22, which then assumes the function of a low-pressure reservoir for the pressure adjustment. Subsequently, the direction of flow of the air in the line 7 reverses. Consequently, the control unit 17 calculates the pressure of the tire $p_{rad}$ using the formula $$p_{rad}=p_{16}+w(p_{16}-p_{15})^x. \qquad (2)$$

As the flow resistance of the line 7 is dependent on direction, the parameters w and y, and x and z have similar but not identical values for the same line 7 in practical application. Hence, the control unit 17 continuously measures the tire pressure $p_{rad}$ while the air flows out of the tire 9 (according to the (2)) and, the poppet valve 10 closes as soon as the desired tire pressure is reached.

The compressed-air line 20 is analogous in design to the compressed-air line 7 and, similar thereto, comprises a throttle point having pressure sensors, a directional control valve, etc. Consequently, the pressure at the rear-wheel tires 21 is adjusted as described above for the front-wheel tires 9. As the geometries of the lines 7, 20 differ, the coefficients w, x, y, z of the aforementioned tire-pressure formulas (1, 2) are also different for front and rear wheels.

FIG. 2 depicts the result of a pressure measurement that carried out at the FIG. 1 system while air was released from the tire 9. Curves $p_{15}$, $p_{16}$, $p_r$ represent pressures measured at the measurement points 15, 16 and in the tire 9, respectively. A curve $p_{rad}$ represents the tire pressure calculated according to formula (2), above. The initial overpressure of the tire 9 was 2 bar, wherein the pressure was released until a final value of 0.7 bar was reached. For practical requirements, the curves $p_r$, $p_{rad}$ are considered to be identical. The pressure drop at the throttle point 12 (which corresponds to the difference between the curves $p_{15}$, $p_{16}$), is greater than the pressure drop at the line section 18 (which is represented by the difference between the curves $p_r$, $p_{16}$). The exponent x is <1 in this case.

The pressure in the tire 9, 21 should be adjusted every time the tractor 1 switches between road and field. Potential courses of such a pressure adjustment are shown in the upper diagram in FIG. 3. FIG. 3 illustrates the development of the pressures in the front-wheel and rear-wheel tires 9, 21 when switching from the road to the field. At the beginning of the pressure adjustment, at time t=0, the starting values $p_{9a}$, $p_{21a}$ of the pressures of the front and rear wheels are the specified pressures for road travel. Target values for the pressure adjustment, which are labeled $p_{9z}$, $p_{21z}$, are the pressures specified for field travel. Each of these is less than the specified pressures for road travel, and the specified pressures $p_{9a}$, $p_{9z}$ for the front-wheel tires 9 are higher than the corresponding pressures $p_{21a}$, $p_{21z}$, respectively, for the rear-wheel tires 21 for field travel and road travel.

One way to adjust the pressure is to open the poppet valves 10 at the front and rear-wheel tires 9, 21 at time t=t0 and, to leave them open until the applicable tires 9, 21 have reached the target value $p_{9z}$, $p_{21z}$ thereof. Due to the higher pressure in the front-wheel tires 9 and the smaller volume thereof, the pressure of the front-wheel tire 9 approaches the target value $p_{9z}$, substantially more rapidly than the rear-wheel pressure approaches the target value $p_{21z}$ thereof (as indicated by curves $p_9$, $p_{21}$ in FIG. 3). The rapid pressure loss at the front-wheel tire 9 causes the front axle to drop, thereby causing the entire chassis of the tractor 1 to tilt downward. This is illustrated by a decreasing curve segment θ1 in the second diagram in FIG. 2, which shows the tilt angle θ of the chassis as a function of time t.

When the front-wheel tires 9 reach the target pressure $p_{9z}$ thereof at time t1, the poppet values 10 of the front-wheel tire 9 are closed and the pressure therein remains constant at $p_{9z}$. Since the rear-wheel tires 21 have not yet reached the target pressure thereof, the pressure decrease continues there and the rear axle also drops accordingly. Therefore, the tilt angle starts to increase once more at time t1 (as illustrated by the curve segment θ2). When the target pressure $p_{21z}$ also has been reached in the rear-wheel tire 21 at time t2, the tilt angle θ of the tractor 1 is once more the same as at the onset t0 of the pressure adjustment.

Due to the intermediate, strong change in the tilt angle θ, however, the soil engagement depth of a soil management tool carried by the tractor 1 would change distinctly. Therefore, when a pressure adjustment is carried out in the above-described manner while the tractor 1 is traveling, it cannot be ensured that the soil management taking place at that time is proper.

The invention carries out the pressure adjustment, however, as follows. First, the control unit 17 determines which of the tires is likely to reach the target value thereof sooner. It can basically be assumed that this is the smaller tire, which is operated at higher pressure, i.e. the front-wheel tire 9 in this case. It also is feasible for the control unit 17 to measure the rate at which the pressures at the front and rear tires change in an early phase of the pressure adjustment, and to relate these rates to the difference between the starting values and target values. On the basis of these data, the control unit estimates the amount of time likely to be required to adjust the pressure for the front and rear wheels.

Next, the control unit 17 holds the poppet valves 10 open at the front and rear-wheel tires 9, 21 until a first intermediate value $p_{9int1}$ has been reached at the tire to be adjusted more rapidly, i.e. the front wheel tire 9 in this case. When this intermediate value for time t'1 has been reached, the poppet valves 10 of the front wheel tires 9 are closed, and the intermediate pressure $p_{9int1}$ is held while the pressure continues to decrease at the rear wheel tires 21.

As shown in the lower diagram in FIG. 3, the tilt angle θ initially develops along the curve θ1 when the valves 10 of the front and rear wheel tires 9, 21 are open, but starts to increase once more along the curve θ' as soon as the valves 10 of the front wheel tires 9 are closed at time t'1.

The valves 10 of the front wheel tires 9 remain closed until time t'2 when the pressure in the rear wheel tires 21 has reached an intermediate value $p_{21int1}$. This intermediate value can be specified in advance such that the tilt angle θ at pressures $p_{9int1}$, $p_{21int1}$ at the front and rear wheel tires 9, 21 has the same value $θ_s$ as the starting values $p_{9a}$, $p_{21a}$ and the target values $p_{9z}$, $p_{21z}$, respectively.

When the tilt angle has reached the starting and target value $θ_s$ at time t'2 and, the valves 10 of the front and rear-wheel tires 9, 21 are open, the tilt angle θ starts to decrease along the curve θ' until a second intermediate value $p_{9int2}$ of the pressure has been reached. At this point, the valves 10 of the front-wheel tire 9 are closed and the tilt angle θ starts to increase again until, at time t'4, an intermediate pressure $P_{21int2}$ of the rear-wheel tires has been reached. At the intermediate pressure, the tilt angle has reached the value $θ_s$ once more and the valves of the front-wheel tires 9 are opened once more.

Since the opening and closing of the valves 10 of the front-wheel tires 9 switches often enough while the pressure of the rear-wheel tires 21 continuously approaches the target value $p_{21z}$, fluctuations in the tilt angle θ can be made as small as necessary. As a result, fluctuations of the engagement depth of a soil management tool can also be limited so narrowly that the soil management is not hindered by a pressure adjustment carried out while the tractor is traveling.

FIG. 4 shows a tractor 1 according to an embodiment of the invention. Components of this tractor, which correspond to those described in FIG. 1, are provided with the same reference signs in FIG. 4 and are not described in detail once more. A substantial difference between the FIG. 4 and FIG. 1 embodiment is that a tilt sensor 23 is connected to the control unit 17 in order to detect the tilt angle, i.e. a swivel angle of the chassis of the tractor 1 about a horizontal axis oriented transversely to the direction of travel.

According to FIG. 4, only one pressure sensor 14 is connected at a measurement point 16 at a section 18 of the compressed-air line 7 extending between the directional control valve 19 and the tire 9 or 21. Such a simplified design makes it possible to measure the tire pressure only under static conditions, i.e., when the directional control valve 19 is closed but the poppet valve 10 between the tire 9 or 21 to be measured and the line section 18 is open, or at least has been open temporarily. Hence, the pressure at the line section 18 is the same as that of the tire to be measured. The tilt sensor 23 also may be combined with the arrangement of two pressure sensors on either side of a throttle point (as shown in FIG. 1) without this having any notable effect on the mode of operation.

In more detail, a pressure adaptation carried out when switching from the road to the field is now described with reference to FIG. 3. First, the control switch 17 opens the poppet valves 10 at the front and rear tires 9, 21, thereby allowing air to flow out of both. Due to the smaller volume and the smaller ground contact area, not only does the pressure at the front tire 9 decrease more rapidly than at the rear tire 21, but the front axle of the tractor 1 also drops more rapidly than the rear axle. This results in the tractor 1 (as shown in FIG. 4) tilts in the counterclockwise direction. This tilting motion is detected by the tilt sensor 23 and is reported to the control unit 17. On the basis of the direction of the tilting motion, the control unit 17 ascertains that the front tire 9 will reach the target pressure $p_{9z}$ thereof sooner than the rear-wheel tire 21 will reach the target pressure $p_{21z}$ thereof.

The ratios are opposite in the event of switching from the field to the road. That is, the pressure in the tire 9, 21 would have to be increased by allowing compressed air to flow out of the reservoir 4, and since the pressure change takes place more rapidly in the front-wheel tire 9 than in the rear-wheel tire 21, the tractor would tilt in the clockwise direction.

As described above, an intermediate value of the pressure $p_{9int1}$ can be specified that, once reached in the front-wheel tire 9, causes the control unit 17 to block the poppet valve 10 of the front-wheel tire 9, but allows that of the rear-wheel tire 21 to open. In this embodiment, however, it is simpler to define a limit value of the tilt angle $θ_s$-ϵ at which, when exceeded, the poppet valve 10 is closed. Once the valve 10 is closed at time t'1, only the pressure $p_{21}$ of the rear-wheel tire changes, the direction of the tilting motion reverses, and the tilt angle moves along the curve θ' shown in FIG. 3 back toward the starting and target value $θ_s$. When this is reached, at time t'2, the poppet valve 10 of the front-wheel tire 9 opens once more and, the tilting motion changes direction once more.

When only one pressure sensor 14 is present (as shown in FIG. 4), the pressure adjustment can be interrupted at any time in order to statically measure the tire pressures $p_9$, $p_{21}$ and, once the target value $p_9$, or $p_{21z}$, respectively, is reached, to terminate the procedure.

It also is feasible to measure pressure at only one of the tires, such as the front-wheel tire 9 in this case, assuming that, once this tire has reached the target pressure $p_{9z}$ thereof and the tilt angle is at the target value $θ_s$, the pressure in the rear-wheel tire 21 also will be at the target value $p_{21z}$ without the need to perform a measurement thereof.

REFERENCE CHARACTERS

1 tractor
2 Front wheel 3 rear wheel
4 high-pressure reservoir
5 diesel engine
6 compressor
7 compressed-air line
8 rotary joint
9 front-wheel tire
10 poppet valve
11 point
12 throttle point
13 pressure sensor
14 pressure sensor
15 measurement point
16 measurement point
17 control unit
18 line section
19 directional control valve
20 compressed-air line
21 rear-wheel tire
22 surroundings
23 tilt sensor As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for adjusting the pressure in at least one first and one second tire ($9$, $21$) of a vehicle ($1$) from a starting value ($p_{9a}$, $p_{21a}$) to a target value ($p_{9z}$, $p_{21z}$), where the target value ($p_{9z}$, $p_{21z}$) is located between the starting value ($p_{9a}$, $p_{21a}$) and a pressure of a pressure reservoir ($4$; $22$), the method comprising the steps of:
   a) allowing air to flow through a first line ($7$) between the first tire ($9$) and the reservoir ($4$; $22$) and through a second line ($20$) between the second tire ($21$) and the reservoir ($4$; $22$);
   b) determining which tire ($9$), is likely to reach the target value ($p_{9z}$) thereof sooner;
   c) throttling the air flow through the line ($7$) of the tire ($9$) identified in step b) or increasing the air flow through the line of the tire ($21$) that was not identified in step b).

2. The method according to claim 1, in which the pressure in the tires ($9$, $21$) is monitored in order to determine which tire ($9$) is likely to reach the target value ($p_{9z}$) thereof sooner.

3. The method according to claim 1, further comprising monitoring the tilt angle ($\theta$) of the vehicle in order to determine which tire ($9$) is likely to reach the target value ($p_{9z}$) thereof sooner.

4. The method according to claim 1, wherein the step of c) throttling includes temporarily blocking the line ($7$) of the tire ($9$) identified in step b).

5. The method according to claim 4, further comprising a preparatory step d) determining at least one intermediate value ($p_{9int1}$, $p_{21int1}$, $p_{9int2}$, $p_{21int2}$) of the pressure for the first and the second tire ($9$, $21$) on the basis of the starting and target values.

6. The method according to claim 5, wherein the tire ($9$) that reaches the intermediate value ($p_{9int1}$) thereof is determined in step b).

7. The method according to claim 5, wherein in step c), the line ($7$) of the tire ($9$) identified in step b) is blocked until the other tire ($21$) has reached the intermediate value ($p_{21int1}$) thereof.

8. The method according to claim 5, wherein the intermediate values ($p_{9int1}$, $p_{21int1}$, $p_{9int2}$, $p_{21int2}$) are defined such that, when the intermediate values in both tires ($9$, $21$) are set, the vehicle ($1$) assumes the same tilt angle ($\theta$) as when the target values ($p_{9z}$, $p_{21z}$) are set.

9. The method according to claim 4, wherein in step c), the line ($7$) of the tire ($9$) identified in step b) is blocked until the tilt angle ($\theta$) has reached a target value ($\theta_s$).

10. The method according to claim 9, wherein the tilt angle that sets in once the target value ($p_{9z}$, $p_{21z}$) is set in the first and the second tire ($9$, $21$) is estimated in advance and is used as the target value ($\theta_s$).

11. The method according to claim 1, further comprising implementing the method when the vehicle ($1$) while traveling.

12. The method according to claim 1, wherein monitoring the pressure in one of the tires ($9$, $21$) comprises measuring a pressure drop ($p_{15}$-$p_{16}$) at the line ($7$, $20$) connecting the tires ($9$, $21$) to the pressure reservoir ($4$; $22$) and estimating the pressure in the tire ($9$, $21$) on the basis of the pressure drop ($p_{15}$-$p_{16}$).

13. Then method according to claim 12, wherein the pressure drop ($p_{15}$-$p_{16}$) is measured at a throttle point ($12$) of the line ($7$).

14. The method according to claim 12, wherein the pressure in the tire ($9$; $21$) is assumed to be a sum of a pressure ($p_{15}$, $p_{16}$) measured at the line ($7$; $20$) and a correction term that is dependent on the pressure drop ($p_{15}$-$p_{16}$).

15. The method according to claim 14, wherein the pressure drop ($p_{15}$-$p_{16}$) is associated with an exponent <1 or with an exponent >1 in the correction term.

* * * * *